(12) United States Patent
Michiwaki et al.

(10) Patent No.: US 6,829,567 B2
(45) Date of Patent: Dec. 7, 2004

(54) MEASUREMENT DATA PROCESSOR AND MEASUREMENT DATA PROCESSING METHOD

(75) Inventors: Hirokazu Michiwaki, Kawasaki (JP); Sadayuki Matsumiya, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 141 days.

(21) Appl. No.: 10/183,390

(22) Filed: Jun. 28, 2002

(65) Prior Publication Data

US 2003/0004691 A1 Jan. 2, 2003

(30) Foreign Application Priority Data

Jun. 29, 2001 (JP) ........................................ 2001-198613

(51) Int. Cl.[7] .............................................. G08C 17/00
(52) U.S. Cl. .................. 702/188; 702/127; 340/539.11
(58) Field of Search ........................... 340/870.11, 3.71, 340/539.26, 870.01, 870.02, 870.07–870.09, 426.2, 506, 517, 531, 539.1, 833.1, 583.2, 539.11, 539.16, 539.17, 539.24, 3.1, 3.3, 3.32, 3.54, 825.72; 702/188, 122, 127, 183–187, 189, 14, 6; 455/556.1, 556.2, 557, 9, 11.1, 422.1, 423, 426.1, 517, 68, 67.11, 420, 419; 701/29, 33, 9, 17, 19, 26, 27, 80, 83, 84; 379/106.01, 106.03, 900

(56) References Cited

U.S. PATENT DOCUMENTS 5,136,285 A    8/1992  Okuyama .............. 340/870.11
6,078,251 A  *  6/2000  Landt et al. ............. 340/10.41
6,442,457 B1 *  8/2002  Jones et al. ................... 701/29
2002/0193152 A1 * 12/2002  Soini et al. .................. 455/569

FOREIGN PATENT DOCUMENTS

DE      3916409 A1    11/1989
DE      4213783 C1    10/1993
EP      1 146 494 A1 * 10/2001
JP      A 2001-41827   2/2001

OTHER PUBLICATIONS

Translation of EP 1 146 494 A1.*

* cited by examiner

Primary Examiner—Hal Wachsman
(74) Attorney, Agent, or Firm—Oliff & Berridge, PLC

(57) ABSTRACT

A mobile communications terminal having a communicator for transmitting and receiving a signal to/from a base station is connected to a measuring instrument through wireless medium and a cable. A control processing software stored in a memory of the mobile communications terminal is executed. The mobile communications terminal converts the measurement data acquired by measurement of the measuring instrument into the same format as the signal transmitted to and received from the base station and the converted measurement data is read into a controller to store in a storage. The measurement data is transmitted from the communicator to the base station to be stored in a data storage and published on a web site in a manner that third party can check.

13 Claims, 8 Drawing Sheets

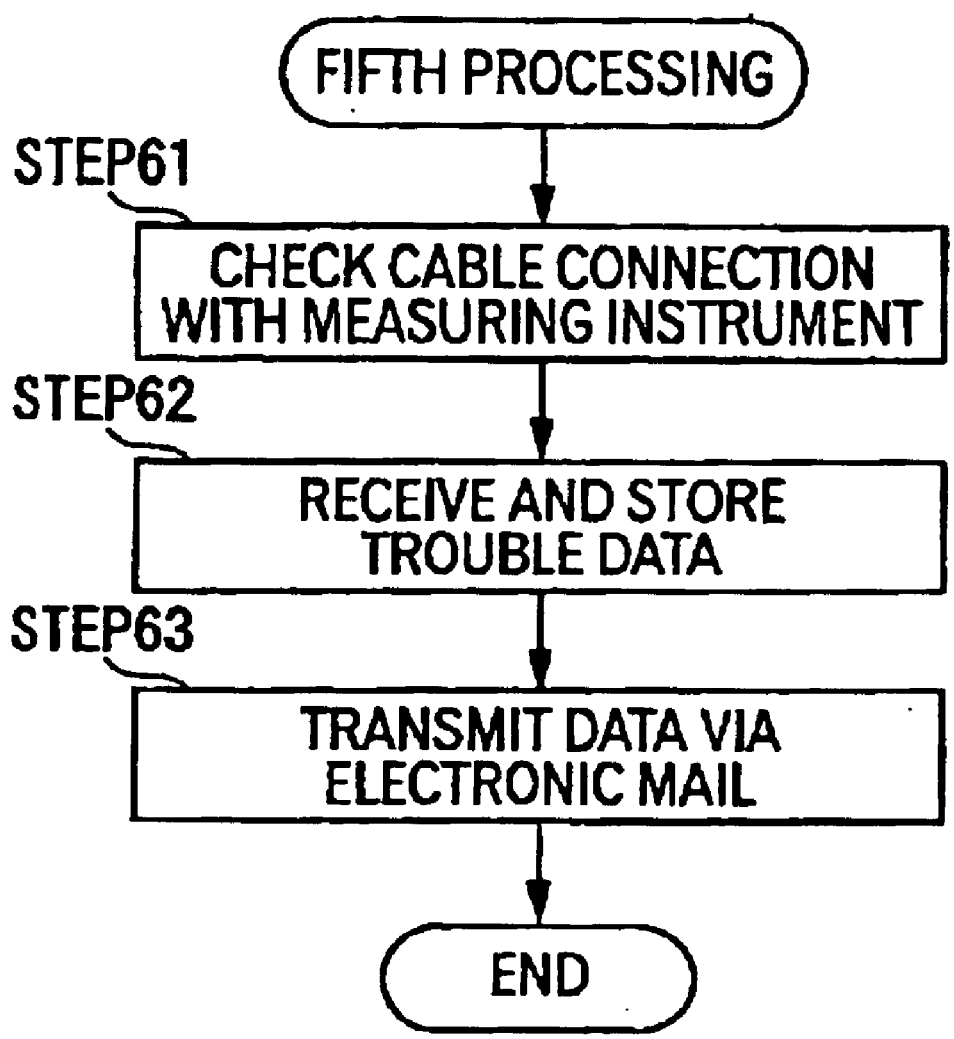

MEASUREMENT DATA PROCESSOR AND MEASUREMENT DATA PROCESSING METHOD

BACKGROUND OF THE INVENTION

1. Field of the Invention

The present invention relates to a measurement data processor for processing measurement data measured by a measuring instrument and measurement data processing method.

2. Description of Related Art

Conventionally, measurement data measured by a measuring instrument is read by a computer system connected to the measuring instrument, where the measurement data is stored in a memory and arithmetically processed to be displayed as a graph. When the measurement data is processed at a place other than measurement site, an arrangement shown in, for instance, Japanese Patent Laid-Open Publication No. 2001-41827 is used, where the measurement data is transmitted to a computer system located at the place other than the measurement site using a modem or a communications terminal through a phone line or radio transmitter.

However, according to the above conventional arrangement, the measurement data can be processed only by the computer system connected to the measuring instrument or other computer system connected to the computer system through a phone line, so that handlability of the measurement data is restricted.

On the other hand, a cellular phone or a PHS (Personal Handyphone System) or other like device is widely used as a mobile communications terminal for transmitting and receiving a signal via a base station by a predetermined operation on an operation key. Such cellular phone and PHS can transmit and receive signals such as document data, picture data and music data as well as functioning as an ordinary phone.

However, it is required for the mobile communications terminal such as cellular phone and PHS to retain its original telephone call function. Accordingly, the mobile communications terminal can only transmit and receive data with relatively small capacity that is in a standardized format, such as document data, picture data and music data. The measurement data measured by the measuring instrument has a data format inherent to each measuring instrument and currently cannot be transmitted and received as an ordinary signal usable by a mobile phone and PHS.

As described above, the conventional arrangement for transmitting and receiving measurement data is restricted to the computer system connected to the measuring instrument or other computer system connected to the computer system in a manner capable of transmitting and receiving signals, so that handlability of measurement data is difficult to improve.

Further, the mobile communications terminal such as a cellular phone and PHS cannot transmit and receive measurement data having a data format characteristic of each measuring instrument without impairing its original function.

SUMMARY OF THE INVENTION

An object of the present invention is to provide a measurement data processor and processing method for more easily processing the measurement data and improving processing efficiency of the measurement data.

A measurement data processor according to an aspect of the present invention has: an operation key; a communicator for transmitting and receiving a signal to/from a base station through a wireless medium; and a controller for reading measurement data acquired by a measuring instrument by operating the operation key after converting the measurement data into the same data format as the signal transmitted and received by the communicator, the controller directing storage of the measurement data from the communicator in a predetermined address space of the base station.

According to the above aspect of the present invention, the measurement data acquired by the measuring instrument is read by the controller after converting the measurement data into the same data format as the signal transmitted to and received from the base station by the communicator by recognizing the operation of the operation key and the measurement data is transmitted by the communicator to the predetermined address space of the base station to be stored.

Accordingly, since the measurement data is sequentially stored at the base station by connecting the mobile communications terminal to the measuring instrument and operating the operation key, no separate computer system having large capacity storage is necessary and the measurement data is more easily transferred using existing measuring instruments, so that the measurement data is not necessary to be stored in the instrument, the measurement data is easily received and the processing efficiency of the measurement data is improved.

A measurement data processor according to another aspect of the present invention includes: an operation key, a communicator for transmitting and receiving a signal to/from a base station through a wireless medium; and a controller for reading measurement data acquired by a measuring instrument by operating the operation key after converting the measurement data into the same data format as the signal transmitted and received by the communicator, the controller transmitting the measurement data from the communicator to another communications terminal through the base station.

According to the above aspect of the present invention, the measurement data acquired by the measuring instrument is read by the controller after converting the measurement data into the same data format as the signal transmitted to and received from the base station by the communicator by recognizing the operation of the operation key and the measurement data is transmitted by the communicator to another communications terminal having the communicator through the base station. Accordingly, the measurement data is easily processed at the location other than the measurement site, so that the processing efficiency of the measurement data is improved. Further, the measurement data is stored in the communications terminal to which the data is transmitted, so that it is not necessary to store the measurement data otherwise.

A measurement data processor according to still another aspect of the present invention includes: a mobile communications terminal including: an operation key, a communicator for transmitting and receiving a signal to/from a base station through a wireless medium; a controller for controlling the communicator by operating the operation key to transmit and receive the signal to/from the base station; and a measurement data reader provided to the mobile communication terminal for reading a measurement data acquired by a measuring instrument after converting the measurement data into the same data format as the signal transmitted and received by the communicator, where the controller controls the communicator to store the measurement data from the communicator in a predetermined address space of the base station.

According to the above aspect of the present invention, the measurement data acquired by the measuring instrument is read by the measurement data reader provided to the mobile communications terminal after converting the measurement data into the same data format as the signal transmitted and received by the communicator, and the controller stores the measurement data in the predetermined address space of the base station. Accordingly, it is only required to provide the measurement data processor to an existing mobile communications terminal such as a cellular phone and PHS, and no separate computer system having large storage capacity is necessary, so that the measurement data is easily transferred and stored without requiring the system to separately memorize the measurement data, thereby enhancing processing efficiency of the measurement data.

A measurement data processor according to a further aspect of the present invention has a mobile communications terminal including: an operation key, a communicator for transmitting and receiving a signal to/from a base station through wireless a medium; a controller for controlling the communicator by operating the operation key for transmitting and receiving the signal to/from a base station; and a measurement data reader provided to the mobile communication terminal for reading measurement data acquired by a measuring instrument after converting the measurement data into the same data format as the signal transmitted and received by the communicator, in which the controller controls the communicator to transmit the measurement data to another communications terminal having another communicator through the base station.

According to the above aspect of the present invention, the measurement data acquired by the measuring instrument is read by the measurement data reader provided to the mobile communications terminal after converting the measurement data into the same data format as the signal transmitted and received by the communicator and the controller transmits the measurement data to another communications terminal having another communicator through the base station. Accordingly, it is only required to provide the measurement data processor to an existing mobile communications terminal such as a cellular phone and PHS, so that the measurement data is processed at a location other than the measurement site, thereby enhancing processing efficiency of the measurement data. Further, since the measurement data is stored in the communications terminal to which the data is transmitted, it is not necessary to store the measurement data in the measurement data processor.

A measurement data processing method according to a further aspect of the present invention is for processing measurement data acquired by a measuring instrument, the method including the steps of: providing a mobile communications terminal including: an operation key; a communicator for transmitting and receiving a signal to/from a base station through a wireless medium; and a controller for controlling the communicator by operating the operation key for transmitting and receiving the signal to/from a base station; connecting the mobile communications terminal to the measuring instrument by cable or wireless; reading the measurement data from the measuring instrument by the controller after converting the measurement data into the same data format as the signal transmitted and received by the communicator; and transmitting the measurement data to the base station by controlling the communicator to store the measurement data in a predetermined address space in the base station.

According to the above aspect of the present invention, when a predetermined operation of the operation key is recognized while the mobile communications terminal is connected to the measuring instrument, the controller reads the measurement data from the measuring instrument after converting the measurement data into the same data format as the signal transmitted and received by the communicator, and the measurement data is transmitted to the base station by controlling the communicator to be stored in the predetermined address space in the base station. Accordingly, the measurement data can be stored in the base station by connecting the mobile communications terminal to the measuring instrument and operating the predetermined operation key, so that there is no need for providing a separate computer system provided with large capacity storage and the measurement data is easily transferred and stored using existing measuring instrument without storing the measurement data in the measuring instrument, thereby facilitating transfer of the measurement data and enhancing processing efficiency of the measurement data.

A measurement data processing method according to a further aspect of the present invention is for processing a measurement data acquired by a measuring instrument, the method comprising the steps of: providing a mobile communications terminal including: an operation key; a communicator for transmitting and receiving a signal to/from a base station through wireless medium; and a controller for controlling the communicator by operating the operation key for transmitting and receiving the signal to/from a base station; connecting the mobile communications terminal to the measuring instrument by cable or wireless; reading the measurement data from the measuring instrument by the controller after converting the measurement data into the same data format as the signal transmitted and received by the communicator; and transmitting the measurement data by controlling the communicator to another communications terminal through the base station.

According to the above aspect of the present invention, when a predetermined operation of the operation key is recognized while the mobile communications terminal is connected to the measuring instrument, the controller reads the measurement data from the measuring instrument after converting the measurement data into the same data format as the signal transmitted and received by the communicator, and the measurement data is transmitted to another communications terminal having another communicator through the base station by controlling the communicator. Accordingly, the measurement data is processed even in a place other than the measurement site and the processing efficiency of the measurement data can be enhanced. Further, since the measurement data is stored in the communications terminal to which the measurement data is transmitted, it is not necessary to store the measurement data in the measuring instrument.

In the present invention, the measurement data reader may be detachably attached to the mobile communications terminal to be connected to the controller. Accordingly, the processing efficiency of the measurement data is enhanced with a simple arrangement of using an existing mobile communications terminal such as a cellular phone or PHS, and attaching separate measurement data reader to the mobile communications terminal.

In the present invention, the measurement data reader may be provided to the measuring instrument for acquiring the measurement data and the controller may read the measurement data acquired by the measuring instrument through the measurement data reader by being connected to the measuring instrument by cable or wireless. Accordingly, the processing efficiency of the measurement data is enhanced with a simple arrangement of using an existing mobile communications terminal such as a cellular phone or PHS, and connecting the mobile communication terminal with the measuring instrument.

In the present invention, the controller may store the measurement data in a memory provided to the mobile communications terminal. Accordingly, the measurement data can be administered and processed by the mobile communications terminal from which the measurement data is transmitted, thereby enhancing processing efficiency of the measurement data. Further, the transmitting method can be changed according to the processing of the measurement data, where the measurement data can be collectively transmitted or can be transmitted simultaneously with reading the data in a real-time manner, thereby enhancing transmission ease and handlability of the measurement data.

In the present invention, a malfunction alarm including a communicator for reporting a malfunction when the communicator receives a predetermined signal may be provided, where the controller controls the communicator to transmit the predetermined signal to the malfunction alarm through the base station when the measuring instrument fails to acquire and read the measurement data. Accordingly, the acquirement error of the measurement data is recognized at a place other than the measurement site and the measurement data can be securely acquired.

In the present invention, the controller may control the communicator to transmit a signal indicating that the measurement data cannot be acquired to another communication terminal through the base station when the measuring instrument fails to acquire and read the measurement data. Accordingly, the acquirement error of the measurement data is recognized at a place other than the measurement site and the measurement data can be securely acquired.

In the present invention, the mobile communications terminal may include a display means for conducting various display operations, step data indicating steps for acquiring the measurement data by the measuring instrument may be stored in the address space of the base station, and the controller may control the communicator to receive the step data stored in the base station and to display the step data on the display means. Accordingly, the acquirement error of the measurement data is recognized by the measuring instrument, thereby enhancing efficiency for acquiring and reading the measurement data to enhance the processing efficiency of the measurement data.

In the present invention, the controller controls the communicator to read the step data for controlling the process for acquiring the measurement data of the measuring instrument stored in the address space of the base station in advance and the measuring process of the measuring instrument is conducted according to the step data. Accordingly, the measurement data is obtained by connecting to the measuring instrument and executing the step data, thereby facilitating acquiring the measurement data.

In the present invention, the controller may have a processor for arithmetically processing the measurement data. Accordingly, the measurement data read by the measuring instrument may be arithmetically processed and displayed in a graph to facilitate evaluation of the measurement result, and the arithmetically processed measurement data can be transmitted so that the load for processing the measurement data at the site to which the measurement data is transmitted can be reduced, thereby improving processing efficiency and handlability of the measurement data.

BRIEF DESCRIPTION OF THE DRAWINGS

FIG. 8 is a flowchart showing a fifth processing of the processing operation of the mobile communications terminal.

DETAILED DESCRIPTION OF PREFERRED EMBODIMENT(S)

An embodiment of the present invention will be described below with reference to attached drawings.

Figure 1:
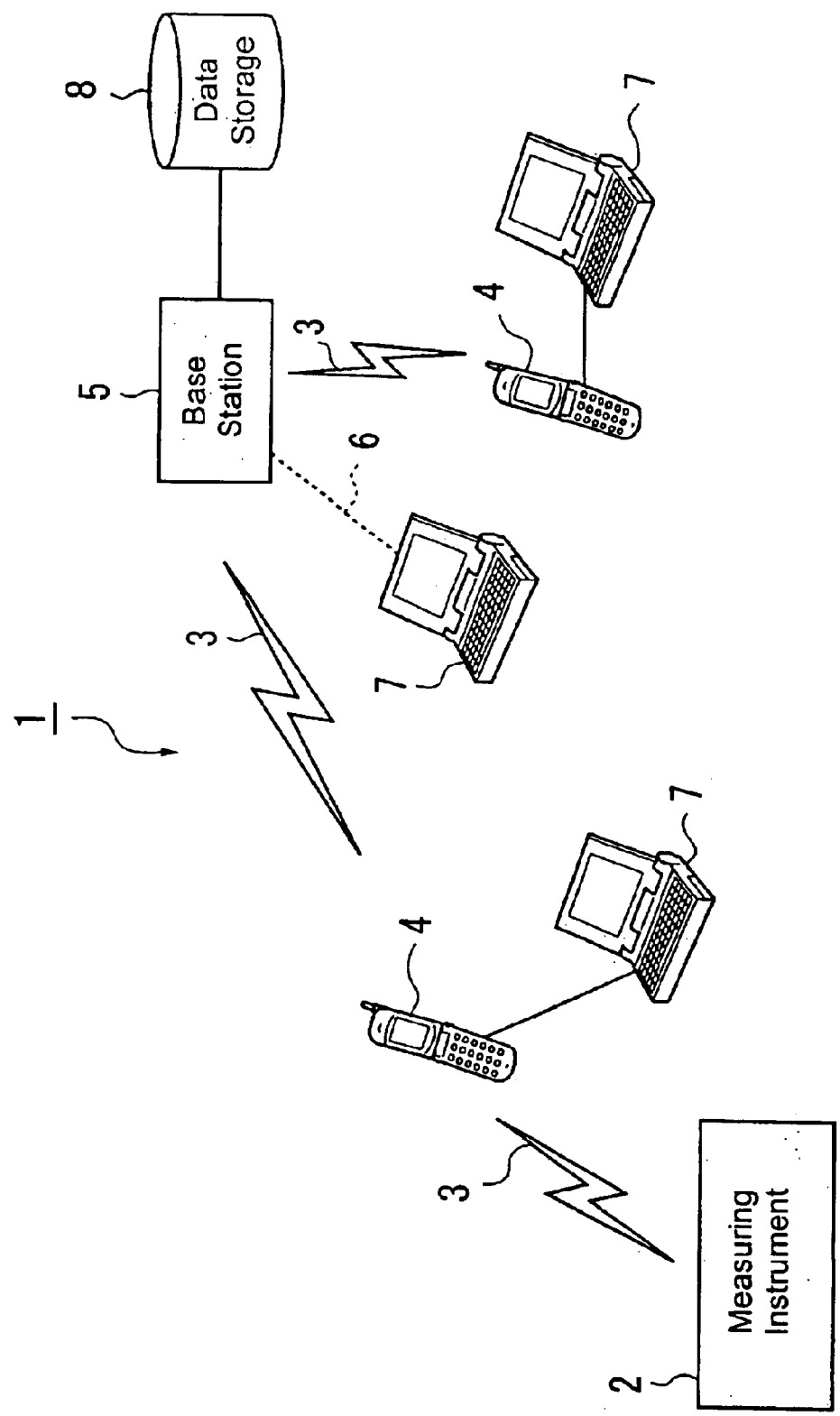
FIG. 1 is a schematic illustration showing a measurement data processing system according to an embodiment of the present invention.

In FIG. 1, a measurement data processing system 1 has a mobile communications terminal 4 connected to a measuring instrument 2 through wireless medium 3 such as radio waves or a cable. The mobile communications terminal 4 is a cellular phone, PHS (Personal Handyphone System) or like device. Incidentally, the measuring instrument 2 and the mobile communications terminal 4 may not be connected through the wireless medium 3 but may be directly connected by wire using a cable and a terminal provided to the measuring instrument 2, or may be connected through a public telephone network. Further, the wireless medium 3 is not restricted to radio waves but may be sound waves or light such as infrared light or visible light.

In the measurement data processing system 1, the mobile communications terminal 4 can transmit and receive signals to/from the mobile communications terminal 4 as the other communications terminal, through a base station 5 via the wireless medium 3 or a computer 7 having a communicator as the other communications terminal.

In the measurement data processing system 1, the mobile communications terminal 4 can transmit and receive signals to/from the base station 5 through the wireless medium 3. The base station 5 for transmitting and receiving signals to/from the mobile communications terminal 4 has a data storage 8 having a predetermined memory capacity and defining a plurality of address spaces capable of storing the signal. A web site such as a homepage can be constructed in the address space of the data storage 8. The base station 5 publishes various data stored in the web site in response to the request of the mobile communications terminal 4 or the computer 7 accessed to the web site, so that the mobile communications terminal 4 and the computer 7 can receive the data.

Figure 2:
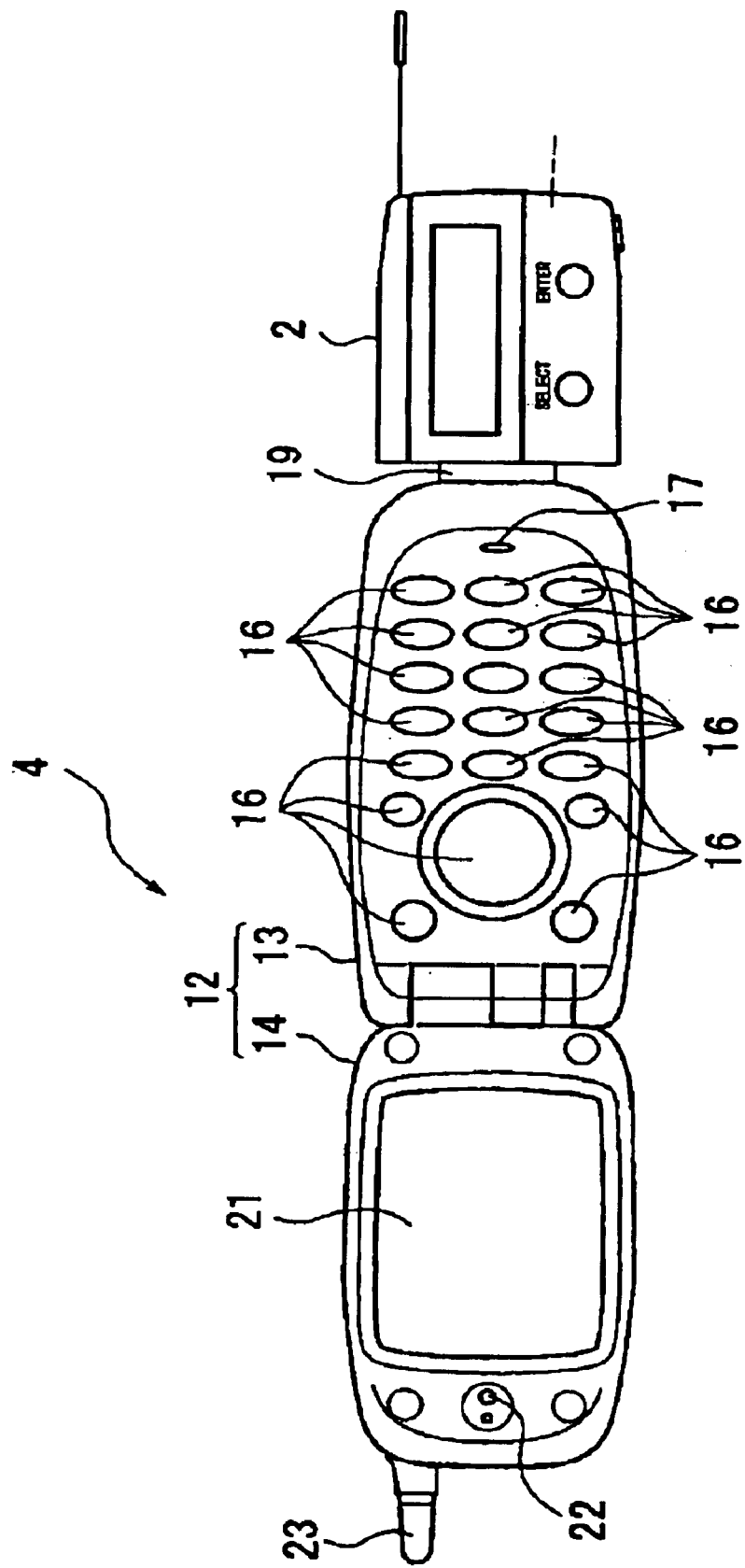
FIG. 2 is a plan view showing a mobile communications terminal to which a measuring instrument of the measurement data processing system is connected.

As shown in FIG. 2, the mobile communications terminal 4 has a body casing 12. The body casing 12 has an operating portion 13 for an operator to hold and a lid 14 with an end rotatably supported by the operating portion 13 and covering a side of the operating portion 13.

A plurality of operation keys 16 are provided on a side of the operating portion 13 covered by the lid 14. A connector (not shown) is provided to the operating portion 13 at a position opposite to the support position of the lid 14. A microphone 17 is provided to the operating portion 13 adjacent to a side of the connector. A terminal 19 provided to the measuring instrument 2 or a cable terminal (not shown) connected to the measuring instrument 2 are detachably connected to the connector. A storage battery (not shown) as a power source is detachably attached to the operating portion 13 at a side opposite to the side on which the operation keys 16 are provided.

A liquid crystal panel 21 is provided on a surface of the lid 14 to be turned to oppose the operating portion 13. A speaker 22 is provided to the lid 14 adjacent to the turning distal end. Further, an antenna 23 is provided to the lid 14 to be extendable from the turning distal end.

A circuit board (not shown) mounted with a controller is provided in the body case 12. An operating means (not shown) for outputting a predetermined electric current in response to operation of the operation key 16 is connected to the controller. The controller detects the electric current outputted by the operating means to send various control commands and convert the electric current from the operating means into character data and the like.

A vocalizer (not shown) including the microphone 17 and the speaker 22 is connected to the controller. The vocalizer is controlled by the controller and detects the electric signal output by the microphone 17 as sound data and converts the sound data into an electric signal and outputs the electric signal to the speaker 22 to generate sound from the speaker 22.

A communicator (not shown) having the antenna 23 is connected to the controller. The communicator is controlled by the controller to transmit the converted signal representing sound data and character data and receives signals from the base station 5. A display means (not shown) including the liquid crystal panel 21 is connected to the controller. The display means is controlled by the controller to display the character data and picture data on the liquid crystal panel 21.

A memory is connected to the controller. The memory readably stores various data and control operations. Further, a control processing software for recognizing the measurement data input by the measuring instrument 2 through the connector is memorized in the memory. The control processing software converts the measurement data into an electric signal, i.e. into the same format as the signal transmitted and received by the communicator to/from the base station. Incidentally, STINGER (tradename) of Microsoft Corporation is an example of usable control processing software.

An operation processing software as a processor for arithmetically processing the data input via the connector is memorized in the memory connected to the controller. Incidentally, the control processing software and the operation processing software may not be stored in the memory, but may be stored in the data storage 8 of the base station 5 in advance and the software may be read and executed from the base station 5 by operating the operation key 16 through the communicator controlled by the controller. Alternatively, the software may be stored in a memory attachable and detachable with the mobile communications terminal 4 and the memory may be connected to the mobile communications terminal 4 in executing the software.

Next, an operation of the above-described embodiment will be described below with reference to attached drawings.

Initially, the terminal 19 of the measuring instrument 2 is connected to the connector of the mobile communications terminal 4. When the measuring instrument 2 is connected, the controller recognizes connection of the measuring instrument 2 and reads out to and starts the control processing software for reading the measurement data from the memory. Incidentally, the control processing software may be started by the operation of the operation key 16.

When the operation key 16 is operated to select the specific control, the controller conducts a control process in accordance with the selected operation.

Figure 3:
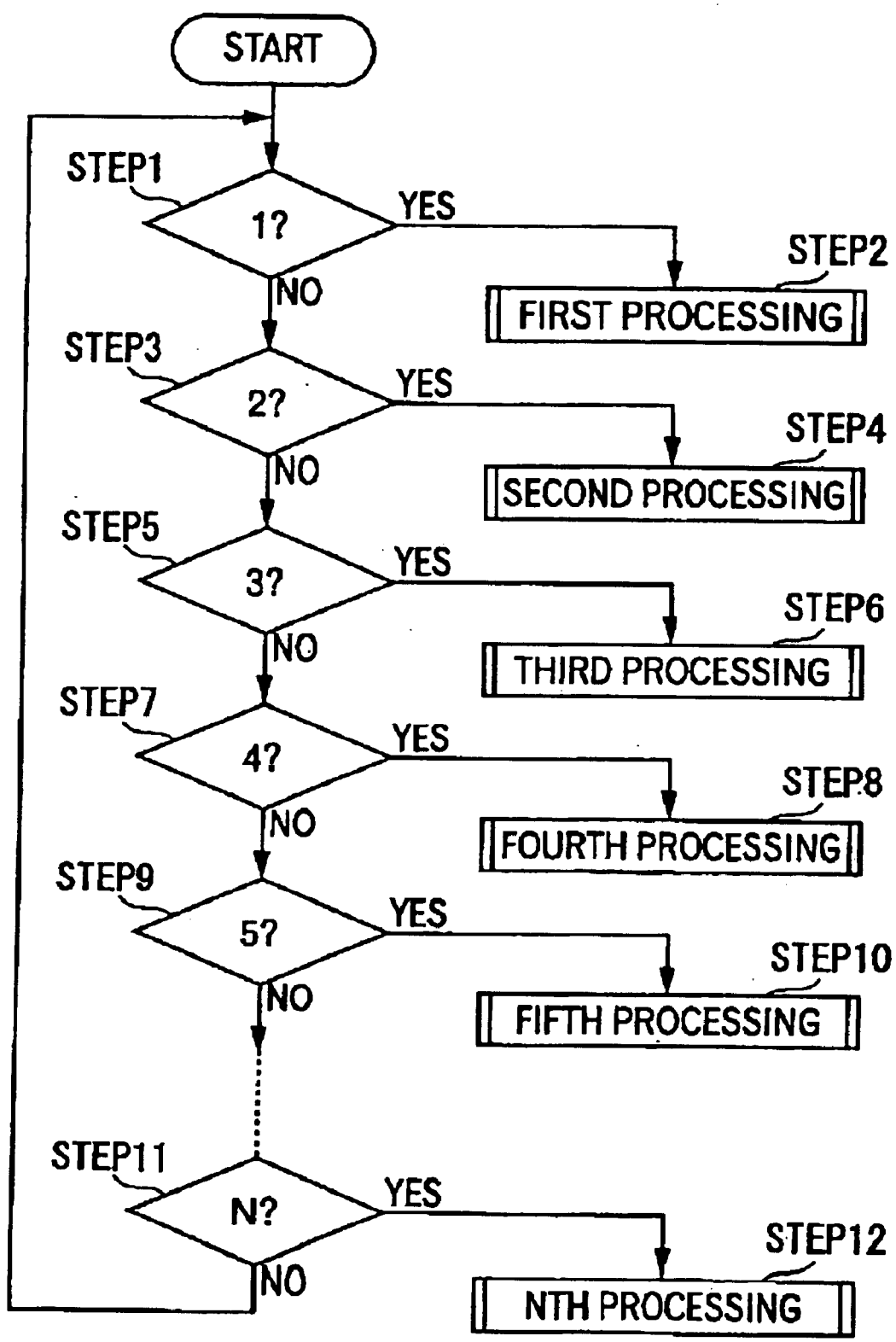
FIG. 3 is a flowchart showing processing operation of the mobile communications terminal of the measurement data processing system.

Specifically, as shown in FIG. 3, the controller determines whether "1" key of the operation key 16 is operated or not (step 1). When operation on the "1" key of the operation key 16 is recognized, the process advances to a first processing (step 2).

When the operation of the "1" key of the operation key 16 is not judged, whether "2" key of the operation key 16 is operated or not (step 3) is determined. When operation on the "2" key of the operation key 16 is recognized, the process advances to a second processing (step 4).

When the operation of the "2" key of the operation key 16 is not judged to be operated, whether "3" key of the operation key 16 is operated or not (step 5) is determined. When operation on the "3" key of the operation key 16 is recognized, the process advances to a third processing (step 6).

When the operation of the "3" key of the operation key 16 is not judged to be operated, whether "4" key of the operation key 16 is operated or not (step 7) is determined. When operation on the "4" key of the operation key 16 is recognized, the process advances to a fourth processing (step 8).

When the operation of the "4" key of the operation key 16 is not judged to be operated, whether "5" key of the operation key 16 is operated or not (step 9) is determined. When operation on the "5" key of the operation key 16 is recognized, the process advances to a fifth processing (step 10).

The operation of the predetermined operation key 16 is sequentially judged as in the above (step 11), and the control process corresponding to the operated operation key is conducted (step 12). Incidentally, when no operation on the operation keys 16 is recognized, the recognizing process of the operation key 16 is repeated back in step 1.

The first processing is a process for functioning the mobile communications terminal 4 as a data logger for reading and sequentially storing the obtained data, i.e. the measured measurement data by the measuring instrument 2.

Figure 4:
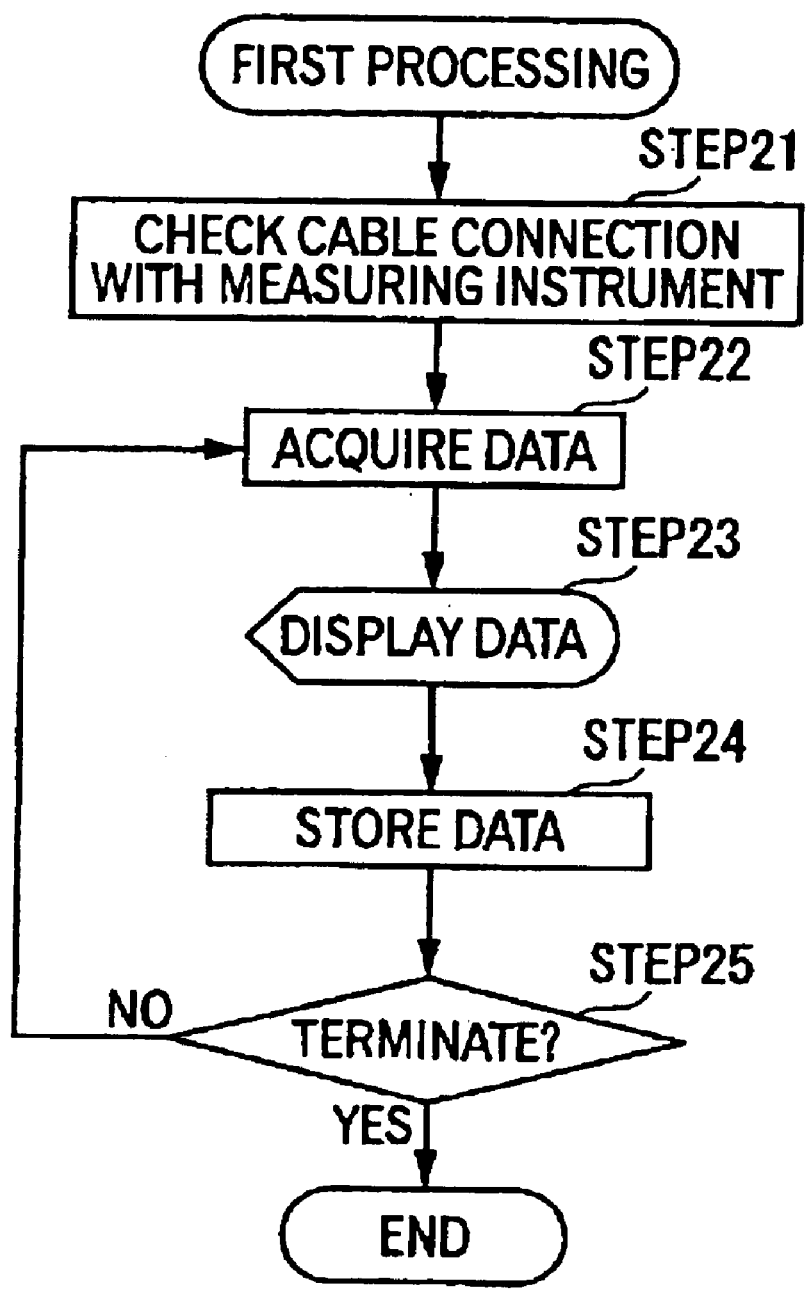
FIG. 4 is a flowchart showing a first processing of the processing operation of the mobile communications terminal.

Specifically, as shown in FIG. 4, the controller checks the connection with the measuring instrument 2 (step 21). When the connection with the measuring instrument 2 is confirmed in step 21, the controller sequentially reads in the measurement data from the measuring instrument 2 in a real-time manner (step 22). Specifically, the controller converts the measurement data into the data format used by the controller in the control processing software, i.e. the same data format as the signal transmitted and received by the communicator to/from the base station 5, and reads in the converted measurement data. Incidentally, when it is judged that the measuring instrument 2 is not connected in the step 21, the controller does not conduct read-in operation of the measurement data.

Then, the controller controls the display means to sequentially display the read measured data on the liquid crystal panel 21 (step 23). The controller may directly display the read measurement data or, alternatively, arithmetically process with the previously read measurement data to display in a graph.

Thereafter, the read measurement data is sequentially stored in the memory (step 24) and the operation button (not shown) of the measuring instrument 2, or the operation key 16 of the mobile communications terminal 4, is operated to determine whether suspension of obtaining the measurement data, i.e. the measurement, by the measuring instrument 2 is commanded or not (step 25). When the operation for suspending the measurement is recognized in step 25, storing and reading the measurement data is suspended to terminate the first processing. When it is judged that the suspension operation of the measurement is not conducted in step 25, judging that the measurement has not been terminated yet, the measurement data is sequentially read in back to step 22.

After terminating the first processing, the process returns again to the recognition of the operation key 16 shown in FIG. 3.

The second processing is a process where the measurement data measured by the measuring instrument 2 is transmitted to the base station 5 to be commonly used on the web site.

Figure 5:
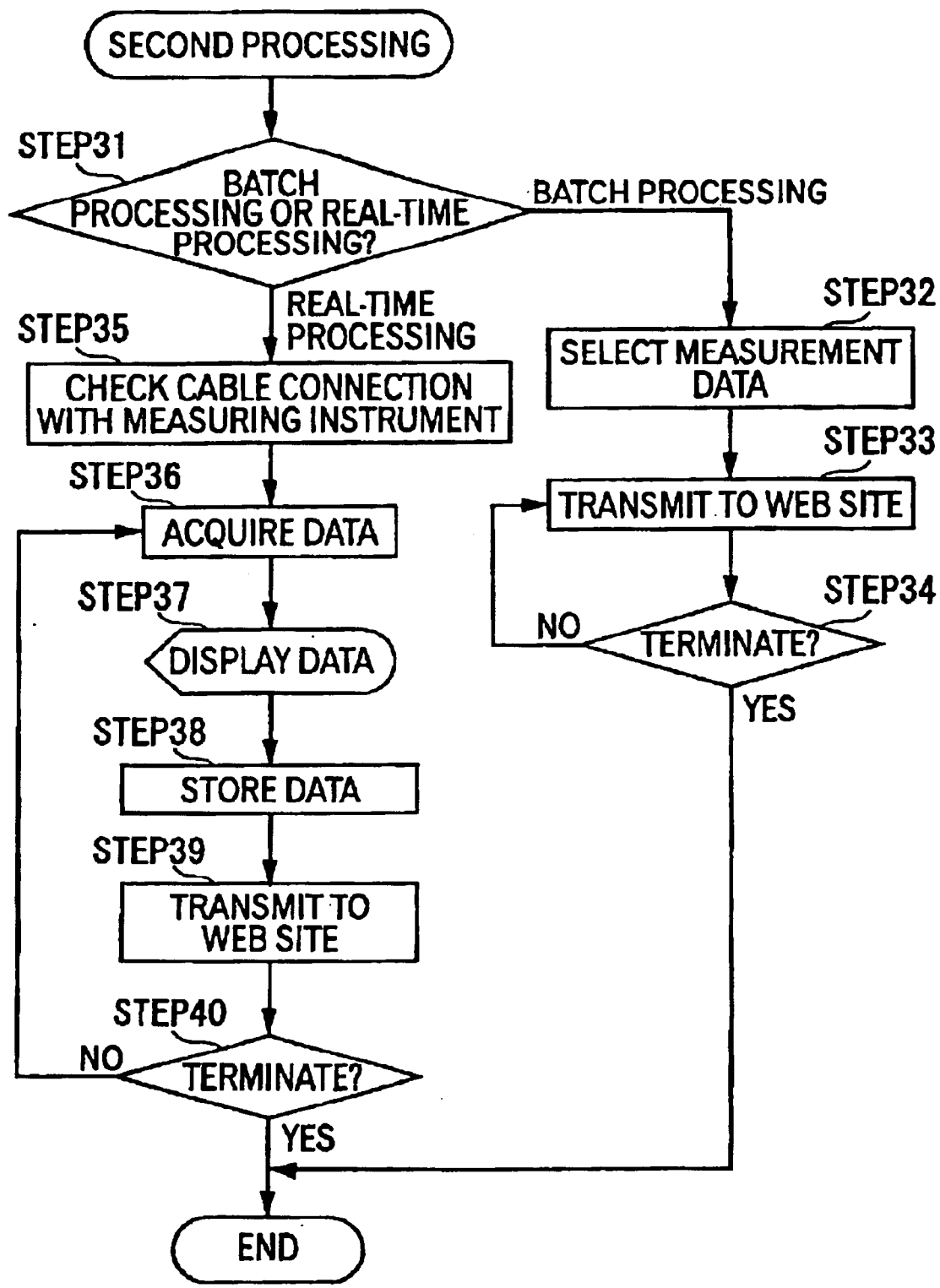
FIG. 5 is a flowchart showing a second processing of the processing operation of the mobile communications terminal.

Specifically, as shown in FIG. 5, when the second processing is selected, the operation key 16 is operated to select real-time processing or batch processing (step 31). The real-time processing refers to sequential transmission of the read measurement data to the base station 5 in a real-time manner. The batch processing refers to collectively transmitting the once read measurement data.

When the controller recognizes that the batch processing is selected in step 31, which one of measurement data among the stored measurement data is transmitted is selected (step 32). Specifically, selection is urged to an operator by displaying that selection of which one of measurement data is to be transmitted is possible. Subsequently, the operation key 16 is operated to transmit the measurement data to the predetermined address space of the base station 5 (step 33). Specifically, the controller controls the communicator so that the measurement data is transmitted to the predetermined address space of the base station 5 (step 33). In other words, the controller controls the communicator to let the selected measurement data among the measurement data stored in the memory be transmitted to the base station 5 to be stored in the data storage 8 of the base station 5. Specifically, the measurement data is stored so that the data is displayed on a predetermined area on the web site.

Subsequently, the predetermined operation key 16 of the mobile communications terminal 4 is operated to determine whether operation for suspending the transmission of the measurement data is conducted or not (step 34). When the suspension of transmitting the measurement data is recognized in step 34, the transmission control of the measurement data by batch processing is terminated. When it is judged that the operation for suspending transmission of the measurement data is not conducted in step 34, judging that the transmission of the measurement data has not been terminated, transmission of the measurement data is continued by returning to step 33. Incidentally, in order to transmit the other measurement data by returning to step 32, the process may be returned to the selection of measurement data to be transmitted.

On the other hand, when the controller recognizes the selection of the real-time processing in step 31, the controller checks the connection with the measuring instrument 2 (step 35). When the controller confirms the connection of the measuring instrument 2 in step 35, the measurement data is read from the measuring instrument 2 in a real-time manner (step 36). Incidentally, when it is judged that the measuring instrument 2 is not connected in step 35, the controller does not read in the measurement data.

The controller controls the display means to display the sequentially read measurement data on the liquid crystal panel 21 (step 37). The controller may directly display the read measurement data or may arithmetically process with the previously read measurement data to display in a graph.

Subsequently, the read measurement data is sequentially stored in the memory (step 38). The controller further transmits the read measurement data to the base station 5 in a real-time manner (step 39).

Then, whether operation for suspending the measurement by operating the operation button (not shown) of the measuring instrument 2 or the operation for suspending the transmission of the measurement data by operating the operation key 16 of the mobile communications terminal 4 is conducted or not is determined (step 40). When suspension of the measurement or the transmission is recognized in step 40, the real-time transmission of the measurement data is stopped. Incidentally, when suspension of the measurement or the transmission is not recognized in step 40, judging that the real-time reading and transmitting of the measurement data has not been completed, the read-in operation of the measurement data is continued by returning to step 36.

The measurement data stored in the base station 5 by the second processing can be browsed on the web site. Specifically, when the measurement data is browsed by the mobile communications terminal 4, the communicator is controlled by operating the operation key 16 to access to the web site incorporating the measurement data of the base station 5. The screen of the web site is displayed on the liquid crystal panel 21 by accessing to the web site. Then, the operation key 16 is operated so that the controller controls the communicator to read the measurement data stored in the data storage 8 of the base station 5 and store in the memory. Incidentally, the measurement data may not be obtained by the mobile communications terminal but may be obtained by accessing the web site through a public telephone network.

Accordingly, the measurement data can be obtained by a mobile communications terminal 4 other than the mobile communications terminal 4 from which the measurement data is transmitted to the base station 5. The operation key 16 of the mobile communications terminal 4 is operated to arithmetically process the measurement data by the operation processing software or to connect to the computer 7 for arithmetic processing and accumulation of the measurement data by the computer 7.

After completing the second processing, the process returns again to the operation of the operation key 16 shown in FIG. 3. Incidentally, the measurement data read by the measuring instrument 2 may not be stored in the memory but may be transferred by the communicator to the base station 5 or other destination through the base station 5.

In the third processing, step data indicating the measurement step of the measuring instrument which is stored in the data storage 8 of the base station 5 in advance is taken into the mobile communications terminal 4 to be served for assisting measurement.

Figure 6:
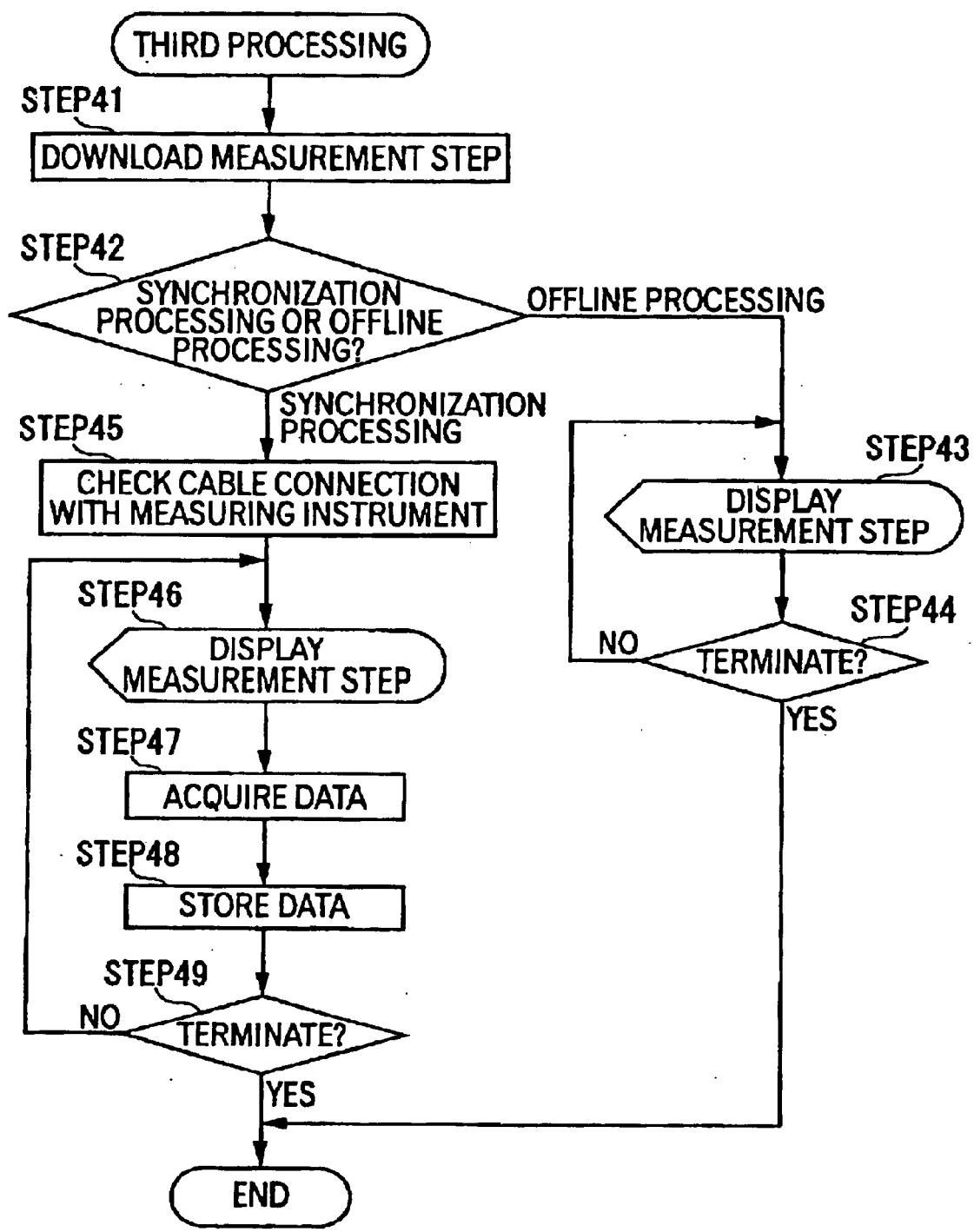
FIG. 6 is a flowchart showing a third processing of the processing operation of the mobile communications terminal.

Specifically, as shown in FIG. 6, when the third processing is selected, the controller controls the communicator to connect to the predetermined web site of the base station 5 and receive, i.e. download, the measurement program as step data of the measurement step stored in the web site in advance (step 41).

Subsequently, while the measurement program is running, the operation key is operated to select offline processing and synchronization processing (step 42). The offline processing refers to a process where the measuring instrument is not synchronized with the downloaded measurement program but uses the measurement program as, for example, an instruction manual for conducting measurement. The synchronization processing refers to a process where the measurement program is synchronized with the measuring instrument and the measuring instrument conducts measurement based on the measurement program.

When the controller recognizes that the offline processing is selected in step 42, the control program executes the measurement program and controls the display means to display the measurement steps (step 43). Subsequently, the controller determines whether the predetermined operation key 16 of the mobile communications terminal 4 is operated to stop displaying the measurement step or not (step 44). When the operation for stopping display of the measurement step is recognized in the step 44, the measurement step display by the offline processing is terminated. Incidentally, when the controller does not recognize the operation for terminating the measurement step display, the display is continued.

On the other hand, when the controller recognizes that the synchronization processing is selected in step 42, the controller checks the connection with the measuring instrument 2 (step 45). When the connection with the measuring instrument 2 is detected in step 45, the measurement program is executed and the display means is controlled to display the measurement step and measurement condition (step 46). The connected measuring instrument 2 is controlled by executing the measurement program and the measurement is automatically started in accordance with the measurement step. The measurement data obtained by the measurement operation of the measuring instrument 2 is sequentially read by the controller (step 47) and is stored in the memory (step 48).

Subsequently, whether termination of the measurement program and suspension of the measurement by operating the operation button (not shown) of the measuring instrument 2 or the predetermined operation key 16 of the mobile communications terminal 4 are conducted or not is determined (step 49). When the termination of the measurement program or the operation for suspending the measurement is recognized in step 49, the synchronization processing is stopped. When the termination of the measurement program or the operation for suspending the measurement is not recognized in step 49, the process returns to step 46 to continue measurement to read and store the measurement data.

After completing the third processing, the process returns to the recognition of the operation of the operation key 16 shown in FIG. 3. Incidentally, in conducting the synchronization processing of the third processing, the measurement data of the second processing may be simultaneously transmitted.

The fourth processing is a process where the measurement error generated when the measurement instrument is automatically operated to sequentially transfer the measurement data is reported.

Figure 7:
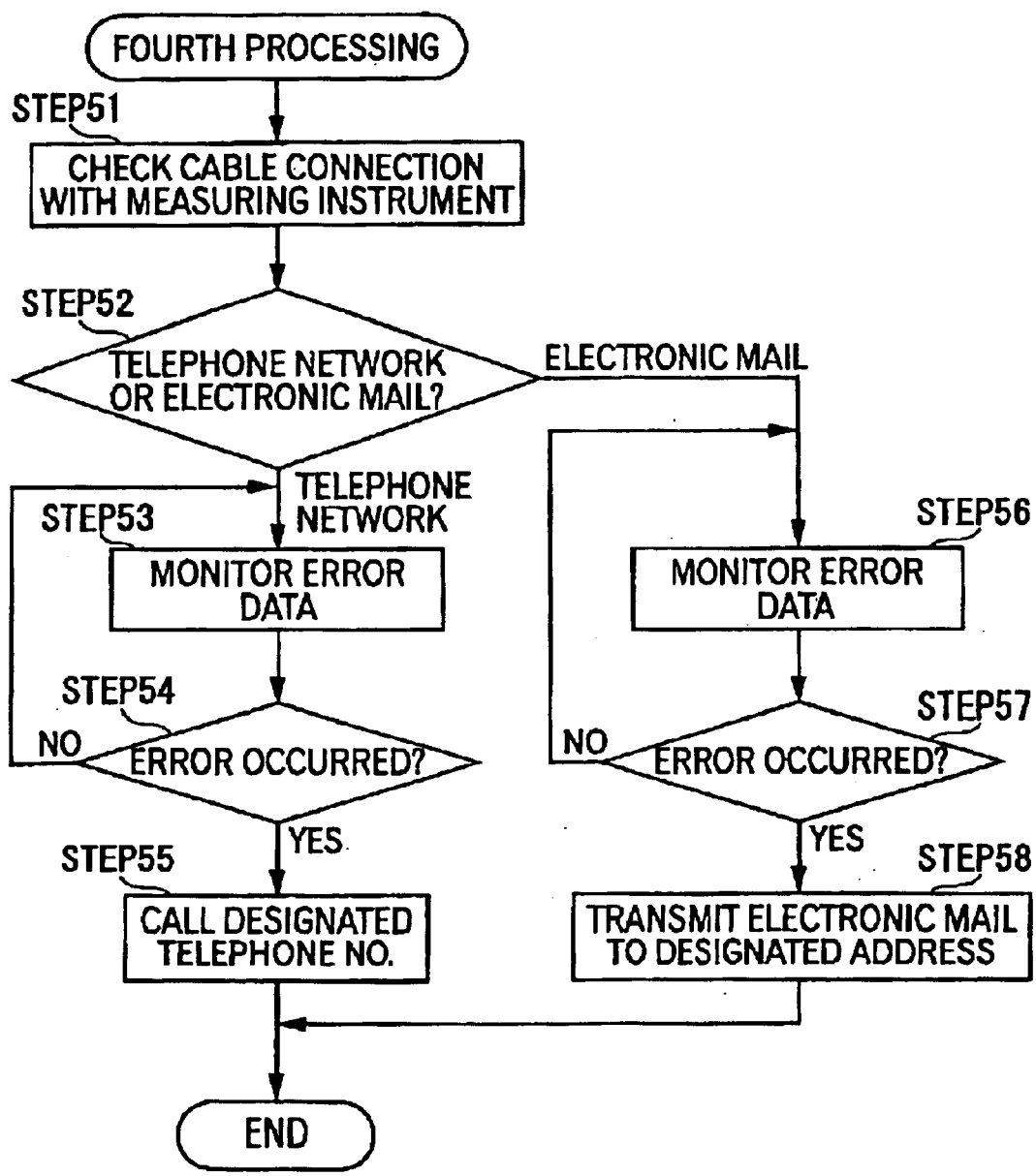
FIG. 7 is a flowchart showing a fourth processing of the processing operation of the mobile communications terminal.

As shown in FIG. 7, when the fourth processing is selected, the controller checks connection with the measuring instrument 2 (step 51). When the connection with the measuring instrument 2 is determined, the use of the telephone network or electronic mail is selected by the operator for reporting the measurement error (step 52).

When the controller recognizes the operation for using the telephone network in step 52, the controller monitors the measurement by the measuring instrument 2 (step 53). Incidentally, in step 53, the measurement error of the measuring instrument 2 is read as a measurement data without acquiring actual measurement data.

During the monitoring condition in step 53, the presence of a measurement error signal from the measuring instrument 2 as measurement data is determined (step 54). When no measurement error is recognized, the process returns to step 53 to continue monitoring the measurement condition.

When the controller recognizes the measurement error, the communicator is controlled to send a signal indicating generation of the measurement error to a predetermined destination stored in the memory in advance using the telephone network through the base station 5 (step 55) to terminate the fourth processing. The signal indicating the generation of the measurement error is sent in a vocal data stored in the memory to the destination using a telephone, or a mobile communications terminal using public telephone network.

On the other hand, when the controller recognizes the operation for using the electronic mail in step 52, the measurement condition is monitored in the same manner as step 53 (step 56).

During the monitoring process of step 56, the presence of the measurement error signal in the form of the measurement data from the measuring instrument 2 is determined (step 57). When the measurement error is not recognized, the monitoring of the measurement condition is continued by returning to step 56.

When the controller recognizes the measurement error, the communicator is controlled to transmit an electronic mail that indicates the measurement error to a predetermined mail address memorized in the memory in advance through the base station (step 58) to terminate the fourth processing.

After completing the fourth processing, the process returns to the recognition of the operation of the operation key 16 shown in FIG. 3. Incidentally, during the fourth processing, the reading process of the measurement data in the first processing, the transmission process of the measurement data in the second processing, and the synchronization process of the third processing may be conducted simultaneously with monitoring the measurement condition.

The fifth processing is a process where the measurement data such as the measurement condition is read for examining the cause of the measurement error occurred in measurement by the measuring instrument.

Specifically, as shown in FIG. 8, when the fifth processing is selected, the controller checks the connection with the measuring instrument 2 in which the measurement error occurred (step 61). When the controller determines that the measuring instrument 2 is connected in step 61, the controller reads the measurement condition and measurement data stored in the measuring instrument 2 to store in the memory (step 62).

Subsequently, the controller controls the communicator and transmits the read measurement condition and the measurement data to a predetermined mail address stored in the memory in advance (step 63). After completing the fifth processing, the process returns to recognition of operation of the operation key 16 shown in FIG. 3. Incidentally, the operation for transmitting measurement condition and measurement data of the fifth processing may be conducted simultaneously with transmission of the measurement error signal in the fourth processing.

According to the above-described embodiment, the following advantages can be obtained.

When the controller recognizes a predetermined operation of the operation key 16, the measurement data measured by the measuring instrument 2 is read after being converted into the same format as the signal transmitted and received by the base station 5 by the communicator, and the read measurement data is transmitted to and stored in a predetermined address space of the data storage 8 of the base station 5 by the communicator. Accordingly, by connecting the mobile communications terminal 4 to the measuring instrument 2 and operating the predetermined operation key 16, the measurement data can be sequentially stored in the base station 5, so that it is not necessary to provide a separate computer system having large capacity storage, and the measurement data can be transmitted and stored in an existing measuring instrument 2. Further, it is not necessary to store the measurement data so that the measurement data can be easily transmitted and received thereby enhancing processing efficiency of the measurement data. Thus, the measurement data can be handled by the mobile communications terminal 4 such as a cellular phone, even when a large amount of the memory area is consumed by main function as a telephone and the area for storing the measurement data is limited.

Further, the measurement data measured by the measuring instrument 2 is read after being converted into the same data format as the signal transmitted and received by the base station 5 with the communicator and the read measurement data is transmitted to the other communications terminal by the communicator through the base station 5 when the controller recognizes a predetermined operation of the operation key 16. Accordingly, the measurement data can be obtained and processed at a place other than the measurement site of the measuring instrument 2 and the processing efficiency of the measurement data can be improved. Further, since the measurement data is preserved in the communication terminal to which the data is transmitted, it is not necessary to store the measurement data. Thus, the measurement data can be handled by the mobile communications terminal 4 such as a cellular phone, even when large amount of the memory area is consumed by main function as a telephone and the area for storing the measurement data is limited.

The read measurement data is stored in the memory of the mobile communications terminal 4 by the controller. Accordingly, the measurement data can be administered and processed by the mobile communication terminal 4 from which the measurement data is transmitted, thereby enhancing the processing efficiency of the measurement data. Further, transmitting methods of the measurement data can be changed in accordance with the processing of the measurement data, where the measurement data can be collectively transmitted and can be transmitted in a real-time manner simultaneously with reading the measurement data, thereby improving handlability of the measurement data.

When the measuring instrument 2 fails to obtain the measurement data and the measurement data cannot be read, the controller controls the communicator to transmit a measurement error signal, indicating that measurement data cannot be obtained, to the other communications terminal through the base station 5. Accordingly, the measurement error of failing to obtain the measurement data can be easily recognized at a place other than the measurement site so that the measurement error can be rapidly responded and the measurement data can be securely obtained.

The communicator is controlled by the controller by operating the operation key 16 to receive the step data stored in the data storage 8 of the base station 5 to display the data on the liquid crystal panel 21 of the display means of the mobile communications terminal 4. Accordingly, the measurement data is more easily obtained by the measuring instrument 2, thereby improving efficiency of the obtaining and reading operations of the measurement data, improving processing efficiency of the measurement data.

The communicator is controlled by the controller by a predetermined operation of the operation key 16 to read the measurement program as a software stored in advance in the data storage 8 of the base station 5 for implementing the measurement operation of the measuring instrument 2. Accordingly, it is only necessary for measurement that the mobile communications terminal 4, having read the measurement program, is connected to the measuring instrument 2 to execute the measurement program, so that a worker without being skilled in the measuring method of the measuring instrument 2 can more easily obtain the measurement data. Further, the measuring instrument 2 can be automatically operated to conduct measurement, thereby facilitating acquiring the measurement data.

The operation processing software for arithmetically processing the measurement data is provided to the controller. Accordingly, the measurement data read by the measuring instrument 2 can be displayed in a graph after arithmetically processing the data to facilitate the examination of the measurement result, or the measurement data can be transmitted after being arithmetically processed to reduce the load for processing the measurement data at the transmitted destination, thereby improving processability and handlability of the measurement data.

The scope of the present embodiment is not restricted to the above-described embodiments but modifications shown below are also included in the scope of the present invention.

The base station 5 is not restricted to a ground station but may be an artificial satellite or mobile arrangement mounted on a vehicle such as movable broadcast station.

The mobile communications terminal 4 is not restricted to a cellular phone and PHS but may be any mobile communications device. Further, the operation key 16 may not be button type, but any arrangement used for the body of the mobile communication device such as liquid crystal touch panel and joystick is possible.

Though the memory is provided to the mobile communications terminal 4, the memory such as a memory card may be detachably attached to the mobile communications terminal 4 and the measurement data may be stored in the memory. Further, the control processing software and the operation processing software or step data and measurement program for implementing measurement of the measuring instrument 2 as the step data may be stored in the detachable memory and executed by reading out from the memory. According to the above arrangement, the existing mobile communications terminal 4 such as a cellular phone or PHS can be used by attaching the memory to the mobile communications terminal 4 in order to improve processing efficiency of the measurement data and use various software and programs corresponding to various measuring instruments 2, thereby improving applicability.

Though the display means is provided to the mobile communications terminal 4, the display means may be omitted and only the vocalizer provided as in a radio. Further, the display means is not restricted to the liquid crystal panel but may be any display device.

Though the control processing software is constructed in the mobile communications terminal 4, i.e. memorized in the memory to be executed, the control processing software may be set in the measuring instrument 2 for reading the measurement data and the mobile communications terminal 4 may be connected with the measuring instrument via cable or wireless for reading the measurement data by the controller of the mobile communications terminal 4. According to the above arrangement, an existing mobile communications terminal 4 such as a cellular phone or PHS can be used by connecting the mobile communications terminal 4 with the measuring instrument 2 in order to enhance processing efficiency of the measurement data.

The measurement data reader is not restricted to the control processing software but may be arranged in any manner such as a hardware of a circuit board mounted with electrical components where the mobile communications terminal 4 converts the measurement data into the same format as the signal transmitted to and received from the base station 5 by the communicator. The hardware may be detachably mounted to the mobile communications terminal 4 as in the above-described memory. Further, the hardware may be detachably attached to the measuring instrument 2 and the measurement data may be read by the mobile communications terminal 4 by connecting the measuring instrument 2 attached with the hardware with the mobile communications terminal 4 by wireless or cable. The measuring instrument 2 may integrally have the hardware.

Though the communicator is controlled to transmit a measurement error signal to the transmission destination through the base station when the measuring instrument fails to obtain the measurement data and the measurement data cannot be read, the measurement error signal may be transmitted to a dedicated malfunction alarm located at a place for a worker to be stationed and the measurement error may be announced on a display or by voice. According to the above arrangement, the failure in obtaining the measurement error can be recognized at a place other than the measurement site.

Though the measurement data is displayed and stored in the data storage 8 on the web site constructed in the address space of the base station 5, the measurement data may be stored in the base station 5 in any manner such that the measurement data can be recognized in response to access from the outside. Further, the measurement data may not be stored in the base station 5 but the base station 5 may be interposed only for transmitting the measurement data to the site for the data to be transmitted.

What is claimed is:

1. A measurement data processor, comprising:
    an operation key;
    a communicator for transmitting and receiving a signal to/from a base station through a wireless medium; and
    a controller for reading measurement data acquired by a measuring instrument by operating the operation key after converting the measurement data into the same data format as the signal transmitted and received by the communicator, the controller directing storage of the measurement data from the communicator to a predetermined address space of the base station.

2. The measurement data processor according to claim 1, wherein the controller controls the communicator by operating the operation key to transmit the measurement data to another communications terminal through the base station.

3. The measurement data processor according to claim 1, wherein the controller controls the communicator to read the measurement data stored in the predetermined address space of the base station in response to operation of the operation key.

4. The measurement data processor according to claim 1, further comprising a malfunction alarm for reporting a malfunction when the communicator receives a predetermined signal,
    wherein the controller controls the communicator to transmit the predetermined signal to the malfunction alarm through the base station when the measuring instrument fails to acquire and read the measurement data.

5. The measurement data processor according to claim 1, wherein the controller controls the communicator to transmit a signal indicating that the measurement data cannot be acquired to another communications terminal through the base station when the measuring instrument fails to acquire and read the measurement data.

6. The measurement data processor according to claim 1, wherein the communicator has a display means for conducting various display operations, step data indicating steps for acquiring the measurement data by the measuring instrument is stored in the predetermined address space of the base station, and the controller controls the communicator to receive the step data stored in the base station and to display the step data on the display means.

7. The measurement data processor according to claim 1, wherein the base station stores step data for controlling the operation of the measuring instrument for acquiring the measurement data in the predetermined address spaces, the measurement data readable by a mobile communications terminal.

8. The measurement data processor according to claim 1, the controller comprising a processor for arithmetically processing the measurement data.

9. A measurement data processor, comprising:
    a mobile communications terminal including: an operation key; a communicator for transmitting and receiving a signal to/from a base station through a wireless medium; and a controller for controlling the communicator by operating the operation key to transmit and receive the signal to/from the base station; and
    a measurement data reader provided to the mobile communications terminal for reading measurement data acquired by a measuring instrument after converting the measurement data into the same data format as the signal transmitted and received by the communicator,
    wherein the controller controls the communicator directing storage of the measurement data from the communicator into a predetermined address space of the base station.

10. The measurement data processor according to claim 9, wherein the measurement data reader is detachably attached to the mobile communications terminal to be connected to the controller.

11. The measurement data processor according to claim 10, wherein the measurement data reader is provided to the measuring instrument for acquiring the measurement data and the controller reads the measurement data acquired by the measuring instrument through the measurement data reader by being connected to the measuring instrument by cable or wireless.

12. The measurement data processor according to claim 9, wherein the mobile communications terminal has a memory for storing the measurement data, and the controller stores the measurement data in the memory.

13. A measurement data processing method for processing measurement data acquired by a measuring instrument, comprising:

providing a mobile communications terminal including: an operation key, a communicator for transmitting and receiving a signal to/from a base station through a wireless medium; and a controller for controlling the communicator by operating the operation key for transmitting and receiving the signal to/from a base station;

connecting the mobile communications terminal to the measuring instrument by cable or wireless;

reading the measurement data from the measuring instrument by the controller after converting the measurement data into the same data format as the signal transmitted and received by the communicator, and transmitting the measurement data to the base station by controlling the communicator to store the measurement data in a predetermined address space in the base station.

* * * * *